(12) United States Patent
Nauertz

(10) Patent No.: US 10,396,515 B2
(45) Date of Patent: Aug. 27, 2019

(54) PORTABLE STORAGE DEVICE WITH POWER DISTRIBUTION SYSTEM

(71) Applicant: Ernest Nauertz, West Dundee, IL (US)

(72) Inventor: Ernest Nauertz, West Dundee, IL (US)

( * ) Notice: Subject to any disclaimer, the term of this patent is extended or adjusted under 35 U.S.C. 154(b) by 0 days.

(21) Appl. No.: 15/875,592

(22) Filed: Jan. 19, 2018

(65) Prior Publication Data

US 2018/0212386 A1 Jul. 26, 2018

Related U.S. Application Data

(60) Provisional application No. 62/425,528, filed on Nov. 22, 2016.

(51) Int. Cl.
| | |
|---|---|
| *A45C 3/00* | (2006.01) |
| *H02H 3/08* | (2006.01) |
| *A45C 11/00* | (2006.01) |
| *A45C 15/00* | (2006.01) |
| *B65H 75/42* | (2006.01) |
| *B65H 75/44* | (2006.01) |
| *H01R 13/66* | (2006.01) |
| *H01R 13/72* | (2006.01) |

(Continued)

(52) U.S. Cl.
CPC ............... *H01R 33/92* (2013.01); *A45C 3/00* (2013.01); *A45C 11/00* (2013.01); *A45C 15/00* (2013.01); *B65H 75/42* (2013.01); *B65H 75/4434* (2013.01); *B65H 75/4471* (2013.01); *H01R 13/6675* (2013.01); *H01R 13/7135* (2013.01); *H01R 33/955* (2013.01); *H02G 11/02* (2013.01); *H02H 3/08* (2013.01); *H02J 7/0042* (2013.01); *H02J 7/0052* (2013.01); *H02J 7/0054* (2013.01); *H02J 7/022* (2013.01); *B65H 2701/34* (2013.01); *H01R 13/72* (2013.01); *H01R 25/003* (2013.01); *H02J 2007/0062* (2013.01)

(58) Field of Classification Search
CPC .. H01R 13/66; H01R 13/665; H01R 13/6675; H01R 13/72; H01R 25/003; H01R 33/92; H01R 33/955; H02G 11/02
USPC .......................... 439/501, 577; 206/701–703
See application file for complete search history.

(56) References Cited

U.S. PATENT DOCUMENTS

| | | | | |
|---|---|---|---|---|
| 4,282,954 A | * | 8/1981 | Hill ........................ | H02G 11/02 191/12.4 |
| 4,875,878 A | * | 10/1989 | Meyer ................... | B65H 75/362 439/501 |

(Continued)

*Primary Examiner* — Edwin A. Leon
*Assistant Examiner* — Oscar C Jimenez
(74) *Attorney, Agent, or Firm* — Foley & Lardner LLP

(57) ABSTRACT

A bag for transporting tools and building supplies includes a body, a first spool, a second spool, an electrical plug coupled to a first electrical cord, and an electrical connector coupled to a second electrical cord and defining an electrical outlet. The body includes a side panel coupled to and extending from a base member. The base member and the side panel cooperate to define an internal volume. The first spool and the second spool are each rotatable relative to the body and positioned within the internal volume. The first and second electrical cords wrap around the first and second spools, respectively, and extend outside of the body. The electrical plug is electrically coupled to the electrical connector. The electrical plug is interfaces with an external power source such that the electrical outlet receives electrical power from the external power source.

20 Claims, 9 Drawing Sheets

(51) Int. Cl.
*H01R 25/00* (2006.01)
*H01R 33/92* (2006.01)
*H02G 11/02* (2006.01)
*H02J 7/02* (2016.01)
*H02J 7/00* (2006.01)
*H01R 13/713* (2006.01)
*H01R 33/955* (2006.01)

(56) References Cited

U.S. PATENT DOCUMENTS

| | | | | |
|---|---|---|---|---|
| 5,494,446 A * | 2/1996 | DeLucia | | H01R 13/72 |
| | | | | 439/4 |
| 5,701,981 A * | 12/1997 | Marshall | | H02G 11/02 |
| | | | | 191/12.4 |
| 5,848,701 A * | 12/1998 | Riccabona | | B25H 3/00 |
| | | | | 206/702 |
| 6,520,444 B1 * | 2/2003 | Muller | | B25H 3/006 |
| | | | | 242/378.4 |
| 6,702,608 B2 * | 3/2004 | Brennan, Jr. | | B25H 3/00 |
| | | | | 280/47.19 |
| 6,909,046 B2 * | 6/2005 | Laity | | H01R 13/72 |
| | | | | 174/50 |
| 7,309,834 B1 * | 12/2007 | Byrd | | B65H 75/425 |
| | | | | 174/135 |
| 7,893,657 B2 * | 2/2011 | Chavakula | | H02J 7/0055 |
| | | | | 320/138 |
| 8,684,295 B2 * | 4/2014 | Taketsuna | | B65H 75/4431 |
| | | | | 242/378.4 |
| 9,144,281 B2 * | 9/2015 | Cross | | A45C 5/14 |
| 9,960,539 B2 * | 5/2018 | Tymus | | H01R 13/6395 |
| 10,074,999 B2 * | 9/2018 | Watson | | H02J 7/0027 |
| 2009/0047826 A1 * | 2/2009 | Velco | | H01R 13/652 |
| | | | | 439/501 |
| 2010/0231161 A1 * | 9/2010 | Brown | | B25H 3/02 |
| | | | | 320/101 |
| 2011/0050162 A1 * | 3/2011 | FallHowe | | H02J 7/0027 |
| | | | | 320/107 |
| 2013/0320925 A1 * | 12/2013 | Yu | | H01R 13/72 |
| | | | | 320/111 |
| 2015/0027836 A1 * | 1/2015 | Zhou | | A45C 9/00 |
| | | | | 190/12 A |
| 2015/0270728 A1 * | 9/2015 | Williams | | H02J 7/0044 |
| | | | | 320/111 |

* cited by examiner

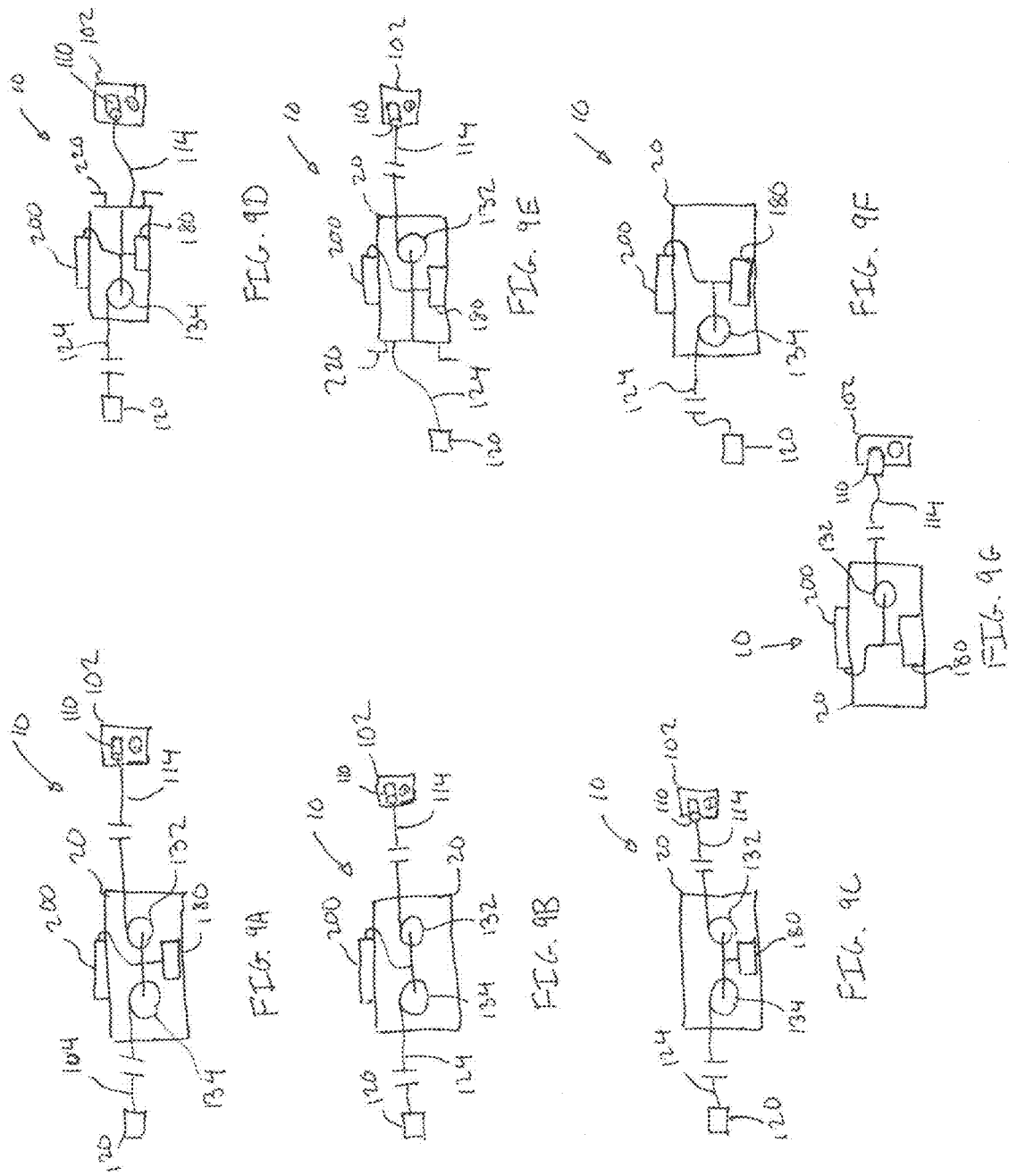

PORTABLE STORAGE DEVICE WITH POWER DISTRIBUTION SYSTEM

CROSS-REFERENCE TO RELATED APPLICATION

This application claims the benefit of priority to U.S. Application No. 62/425,528, filed Nov. 22, 2016, which is hereby incorporated by reference in its entirety.

BACKGROUND

Craftsmen, such as construction workers, carpenters, plumbers, electricians, or other contractors utilize a variety of electric tools (e.g., hand drills, reciprocating saws, flashlights, etc.) that operate using energy stored in rechargeable batteries. Such rechargeable batteries are often removable such that a first battery can be charged in a charger while a second battery is utilized by the craftsman. Chargers generally require a connection to an alternating current power source, such as a generator or a power grid, to function. As such, chargers are removed from the craftsman's tool bag and placed near connections to power sources, which can be remote from the area where the craftsman is working. Craftsmen move frequently while performing their work, both throughout different areas of a job site and between different job sites. Accordingly, batteries and chargers can be left behind when not returned to their tool bags prior to leaving the area, resulting in a loss of batteries and chargers.

Additionally, craftsmen utilize other electric tools (e.g., circular saws, air compressors, radios, etc.) that require a connection to an alternating current power source through an electrical outlet. These tools often have relatively short cords to facilitate transportation of the tools when the tools are not being operated. Accordingly, the electrical outlets available to the craftsman at a job site often cannot be reached solely with the cord of the tool. To facilitate connecting the tools to distant electrical outlets, craftsmen utilize extensions cords. Extension cords can be bulky, tangle easily, and require time to time and effort to unwind and rewind when moving between areas.

SUMMARY

One exemplary embodiment relates to a bag for transporting tools and building supplies including a body, a first spool, a second spool, a first electrical cord, an electrical plug coupled to a distal end of the first electrical cord, a second electrical cord, and an electrical connector coupled to a distal end of the second electrical cord and defining at least one electrical outlet. The body includes a base member and at least one side panel coupled to the base member and extending from the base member. The base member and the at least one side panel cooperate to define an internal volume. The first spool and the second spool are each rotatable relative to the body and positioned within the internal volume. The first electrical cord wraps at least partially around the first spool and extends outside of the body. The second electrical cord wraps at least partially around the second spool and extends outside of the body. The electrical plug is electrically coupled to the electrical connector though the first electrical cord and the second electrical cord. The electrical plug is configured to interface with an external power source such that the at least one electrical outlet receives electrical power from the external power source.

Another exemplary embodiment relates to a portable storage device for transporting equipment including a body defining an internal volume, a spool, an electrical cord extending outside of the body, an electrical plug coupled to a distal end of the electrical cord, and a power strip coupled to the body and defining a plurality of electrical outlets. The spool is rotatable relative to the body and positioned within the internal volume, and the electrical cord wraps at least partially around the spool. The electrical plug is electrically coupled to the power strip though the electrical cord. The electrical plug is configured to interface with an external power source such that the electrical outlets each receive electrical power from the external power source.

Yet another exemplary embodiment relates to a portable power supply including a body defining a storage space, a spool, a first electrical cord extending outside of the body, an electrical connector coupled to a distal end of the first electrical cord and defining at least one electrical outlet, and a power strip coupled to the body and defining a plurality of electrical outlets. The spool is rotatable relative to the body and positioned within the storage space. A proximal end of the first electrical cord wraps at least partially around the spool. The electrical connector is electrically coupled to a power source though the first electrical cord, and the power strip is electrically coupled to the power source. The at least one electrical outlet of the electrical connector and the electrical outlets of the power strip are configured to receive electrical power from the power source.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 9A is a schematic diagram of a portable storage device including a power distribution system, according to another exemplary embodiment;

FIG. 9B is a schematic diagram of a portable storage device including a power distribution system, according to another exemplary embodiment;

FIG. 9C is a schematic diagram of a portable storage device including a power distribution system, according to another exemplary embodiment;

FIG. 9D is a schematic diagram of a portable storage device including a power distribution system, according to another exemplary embodiment;

FIG. 9E is a schematic diagram of a portable storage device including a power distribution system, according to another exemplary embodiment;

FIG. 9F is a schematic diagram of a portable storage device including a power distribution system, according to another exemplary embodiment; and FIG. 9G is a schematic diagram of a portable storage device including a power distribution system, according to another exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a portable storage device includes a body defining an internal volume and an electrical power distribution system. The internal volume is configured to store one or more pieces of equipment or various supplies. The system includes a first electrical cord electrically coupled to a plug configured to receive electrical power from an external power source. The first electrical cord can be extended by pulling in order to reach a distant external power source. The system further includes an onboard power source positioned within the internal volume for use when no external power sources are available. The first electrical cord and the onboard power source are electrically coupled to a circuit breaker. The circuit breaker selectively electrically couples the first electrical cord and the onboard power source to a power strip, a second electrical cord, and a battery charger. The power strip defines a plurality of electrical outlets and is coupled to an exterior surface of the body. The second electrical cord is electrically coupled to an electrical connector that defines one or more electrical outlets. The second electrical cord can be extended by pulling in order to reach distant locations. The battery charger is configured to charge one or more rechargeable batteries. The portable storage device facilitates a user utilizing equipment that requires electrical power while working away from an external power source.

Figure 1:
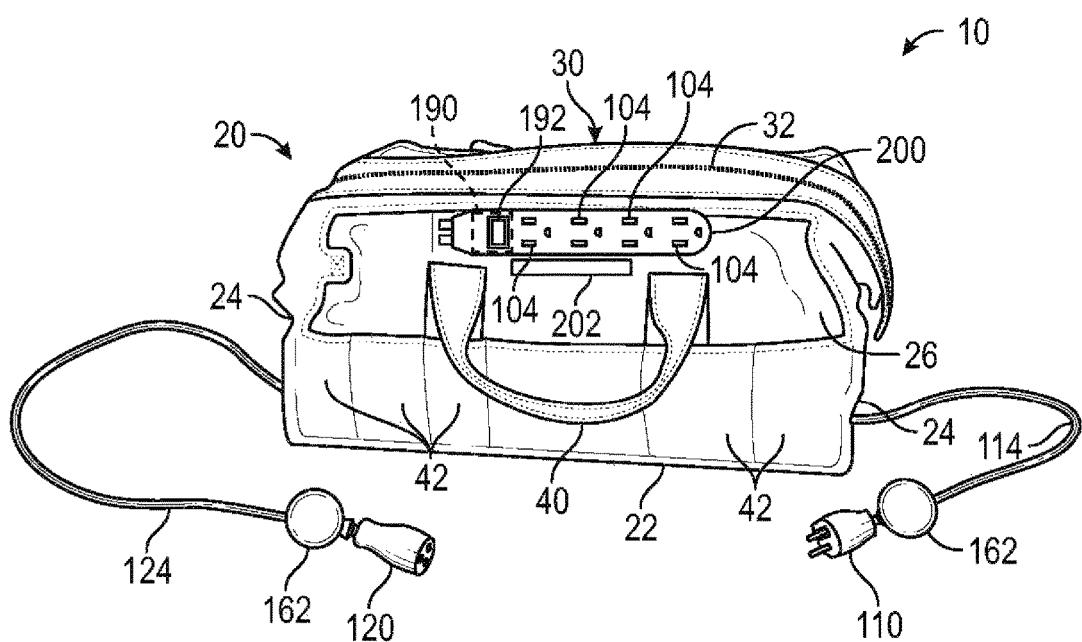
FIG. 1 is a perspective view of a portable storage device including a power distribution system, according to an exemplary embodiment.
Figure 2:
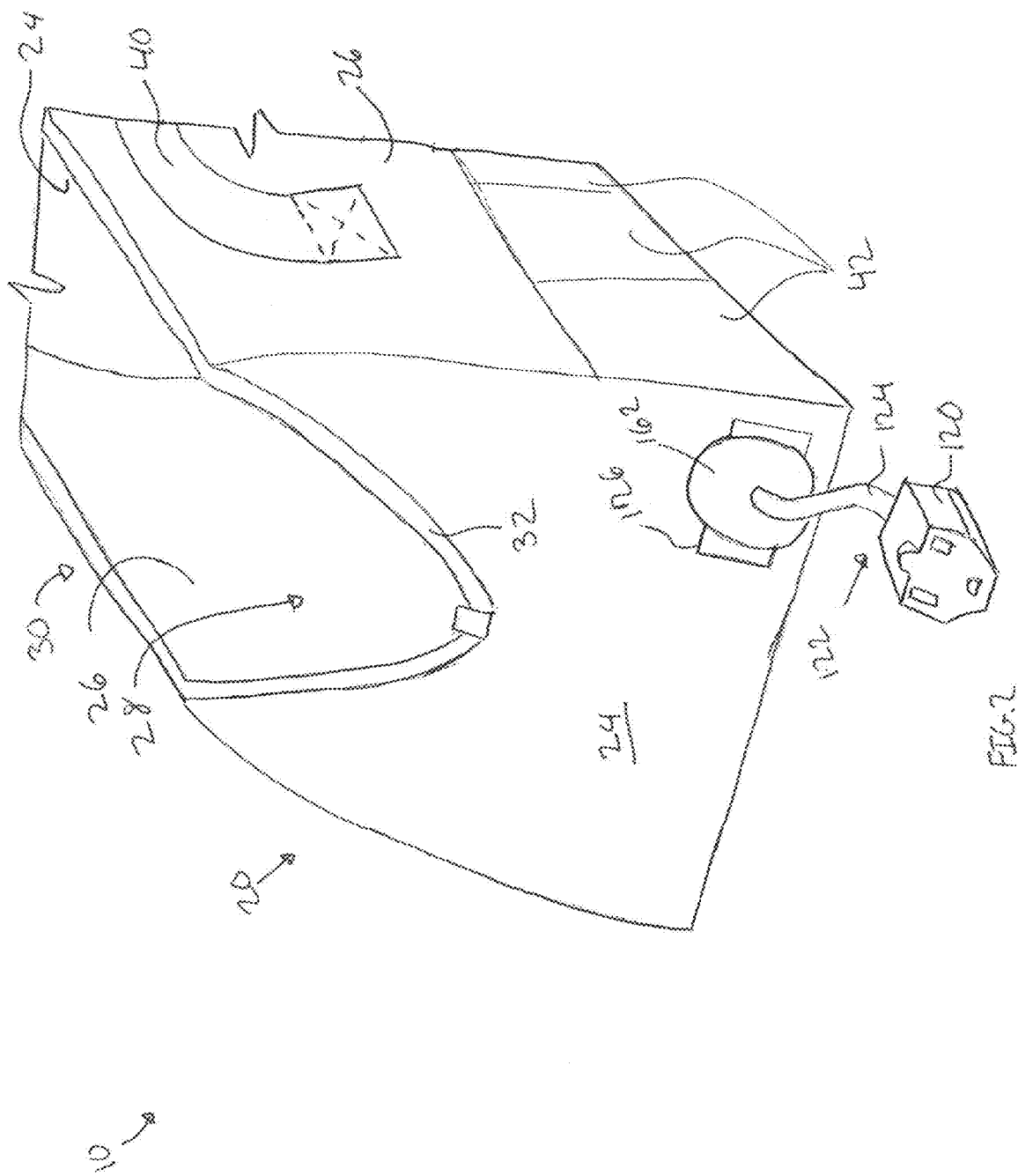
FIG. 2 is a left side perspective view of the portable storage device of FIG. 1.
Figure 3:
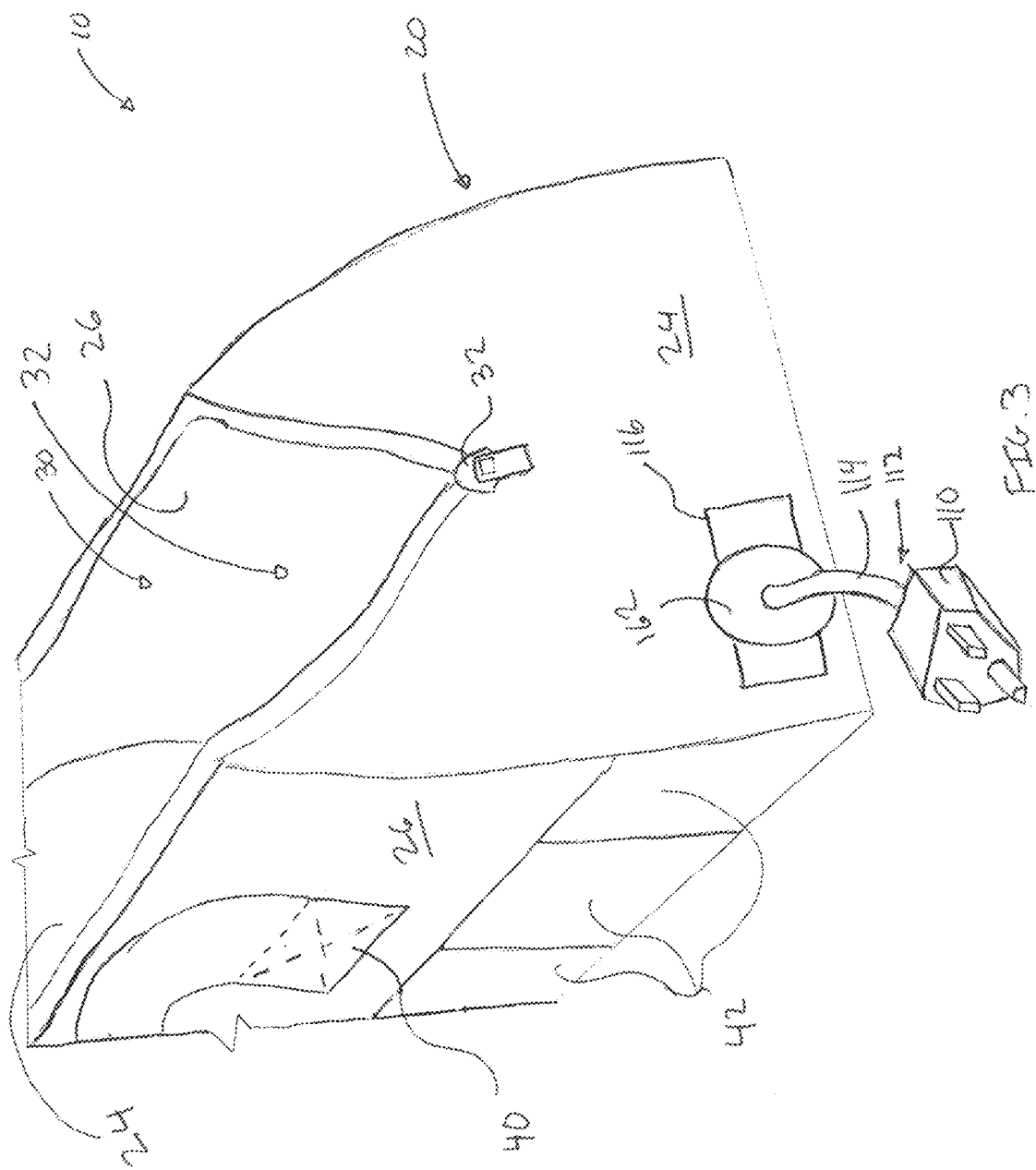
FIG. 3 is a right side perspective view of the portable storage device of FIG. 1.

Referring to FIGS. 1-3, a portable storage device, shown as tool bag 10, is configured to hold one or more items for storage and portable transportation. The tool bag 10 includes a body 20 that serves as the exterior structure of the tool bag 10. The body 20 includes a bottom panel or wall, shown as base member 22, a pair of lateral side members or walls, shown as side panels 24, and a pair of longitudinal side members or walls, shown as side panels 26. A bottom edge of each of the side panels 24 and the side panels 26 is coupled to the base member 22 such that the side panels 24 and the side panels 26 extend generally upward from the base member 22. A pair of vertically-extending edges of each side panel 24 are coupled to corresponding vertically-extending edges of the side panels 26. The base member 22, the side panels 24, and the side panels 26 cooperate to define a portion, volume, or storage space of the body 20, shown as internal volume 28. The internal volume 28 may be used to store tools (e.g., hammers, drills, saws, etc.), building supplies (e.g., nails, screws, wire nuts, etc.), or other equipment. Upper edges of each of the side panels 24 and the side panels 26 cooperate to define a main aperture or main opening 30. The main opening 30 extends from the outside of the body 20 to the internal volume 28 and provides a user with access to the internal volume 28 from outside the body 20. The main opening 30 may be closed or opened by moving the side panels 26 closer together or farther apart, respectively. A closure mechanism, shown as zipper 32, extends along the upper edges of the side panels 24 and the side panels 26. The zipper 32 selectively holds the side panels 24 and the side panels 26 in a fully closed position, preventing access to the internal volume 28 through the main opening 30.

As shown in FIG. 1, the base member 22, the side panels 24, and the side panels 26 are made from a flexible fabric material. Alternatively, other materials may be used, such as leather, rubber, hard plastic, or metal. The base member 22, the side panels 24, and the side panels 26 may be coupled to one another using stitching, fasteners, welding, adhesives, or other coupling methods. Alternatively, one or more of the base member, the side panels 24, and the side panels 26 may be integrally formed from a single piece of material. The tool bag 10 further includes handles or straps, shown as handles 40, coupled to the body 20. Additionally, storage compartments, shown as pockets 42, are coupled to the body 20. The pockets 42 may be located within the internal volume 28 or along an exterior surface of the body 20.

Figure 4:
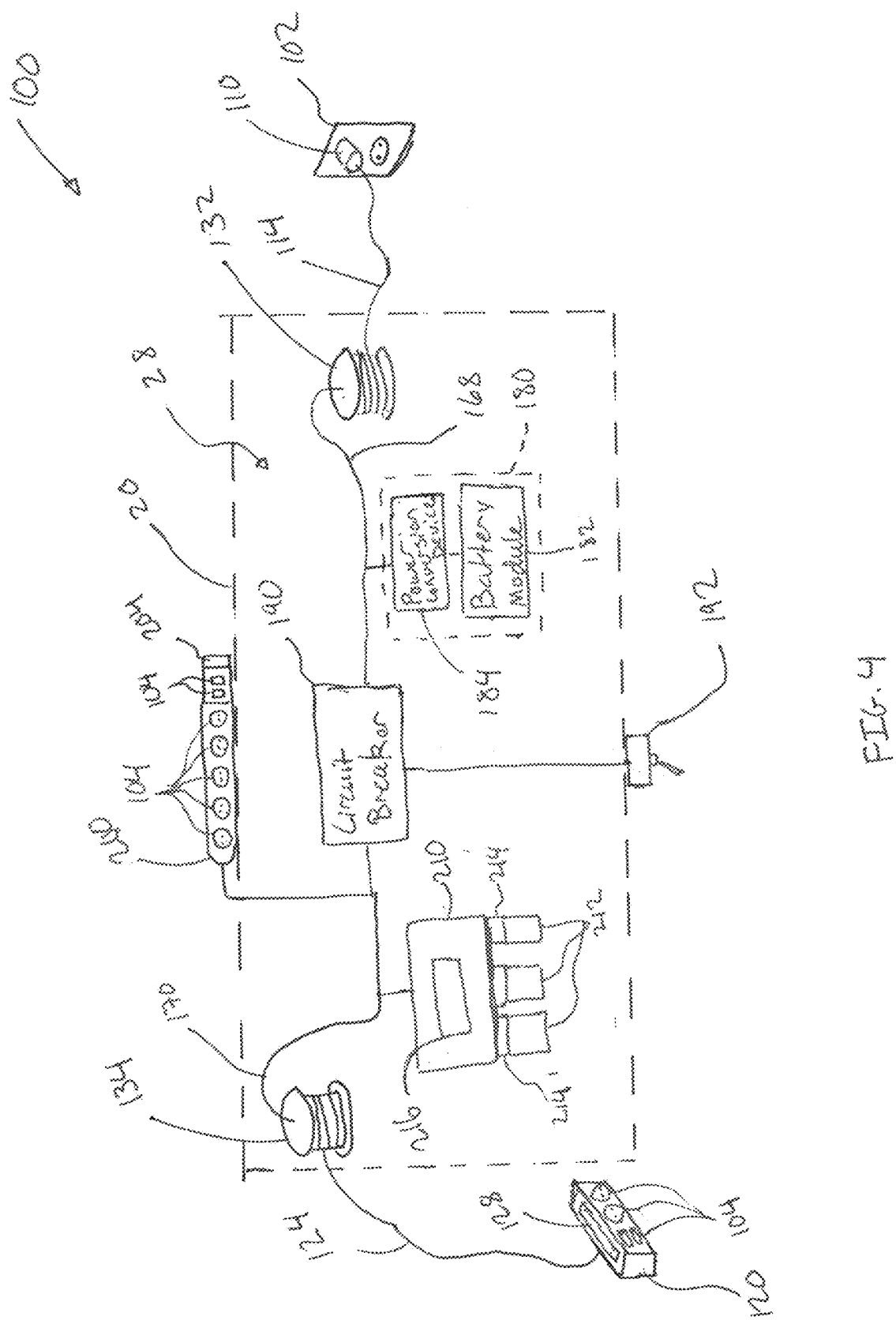
FIG. 4 is a block diagram of a power distribution system, according to an exemplary embodiment.

Referring to FIG. 4, the tool bag 10 further includes an electrical power distribution system, shown as system 100. A dashed line illustrates which components are located inside and outside of the internal volume 28. The system 100 is configured to receive electrical power (e.g., AC electrical power, DC electrical power, etc.) from an external power source 102, and distribute the electrical power to one or more electrical outlets 104 to power one or more pieces of equipment (e.g., saws, drills, air compressors, etc.). The external power source 102 may be a power grid, a generator, a battery, a battery in combination with a power inverter, or another type of power source. The electrical outlets 104 include standard electrical outlets configured to interface with a standard electrical plug (e.g., a standard two-pronged or three-pronged electrical plug). Accordingly, the type of electrical outlet 104 used may vary depending on the intended country of use. The electrical outlets 104 may additionally or alternatively include universal serial bus (USB) ports or other types of electrical outlets (e.g., electrical outlets configured to interface with a rechargeable power tool battery).

Referring to FIGS. 1, 3, and 4, the system 100 includes an electrical plug 110 configured to interface with an electrical outlet of the external power source 102. The electrical plug 110 is shown as a three-pronged male plug configured to interface with a standard American electrical outlet that provides AC electrical power at 120 volts. In other embodiments, the electrical plug 110 is configured to interface with another type of electrical outlet (e.g., an electrical outlet of a different country). The electrical plug 110 is coupled to a distal end 112 (i.e., an end extending from the body 20) of a first electrical cord, shown as electrical cord 114, such that the electrical plug 110 is electrically coupled to the electrical cord 114. The electrical cord 114 extends from outside of the body 20 through an aperture 116 defined by one of the side panels 24 and into the internal volume 28.

Referring to FIGS. 1, 2, and 4, the system includes an electrical connector 120 defining one or more electrical outlets 104. The electrical connector 120 is coupled to a distal end 122 of a second electrical cord, shown as electrical cord 124, such that the electrical connector 120 is electrically coupled to the electrical cord 124. The electrical cord 124 extends from outside of the body 20, through an aperture 126 defined by the side panel 24 opposite the aperture 116, and into the internal volume 28. Alternatively, the aperture 126 and the aperture 116 may be defined by the same side panel 24 or by one or both of the side panels 26. Further alternatively, both the electrical cord 114 and the electrical cord 124 may extend through the aperture 116. Even further alternatively, one or both of the electrical cord 114 and the electrical cord 124 may extend through the main opening 30.

Referring to FIG. 4, in some embodiments, the electrical connector 120 includes a power conversion device 128. In some embodiments, the power conversion device 128 includes power conversion electronics (e.g., inverters, converters, voltage regulators, current limiting devices, etc.) configured to regulate the electrical power provided by each electrical outlet 104 of the electrical connector 120. The power conversion electronics may modify the current or voltage provided by the electrical outlets 104 or whether the electrical outlets 104 output AC or DC electrical power.

Figure 5:
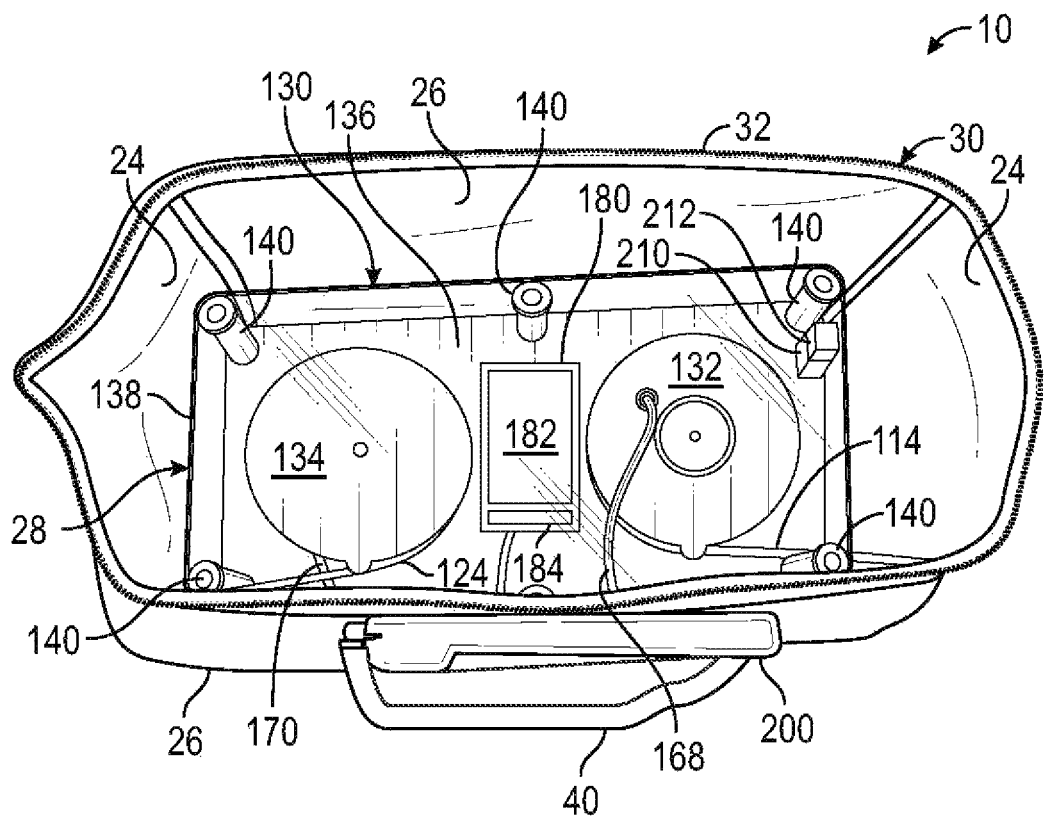
FIG. 5 is a top view showing an interior of the portable storage device of FIG. 1, according to an exemplary embodiment.

Referring to FIG. 5, a proximal end of the electrical cord 114 opposite the distal end 112 and a proximal end of the electrical cord 124 opposite the distal end 122 are received within a spool assembly 130. The spool assembly 130 includes a first spool or drum, shown as spool 132, and a second spool or drum, shown as spool 134. The spool 132 and the spool 134 are positioned between a first plate, shown as base plate 136, and a second plate, shown as divider 138. The spool 132 and the spool 134 are rotatably coupled to the base plate 136 and the divider 138. The spool 132 and the spool 134 are each configured to rotate about a vertical axis. The spool 132 and the spool 134 rotate independent of one another. The base plate 136 is coupled to the divider 138 by a set of spacers or standoffs 140 positioned between the base plate 136 and the divider 138. The standoffs 140 each have a predetermined length such that the base plate 136 and the divider 138 are offset by a predetermined distance.

Figure 7:
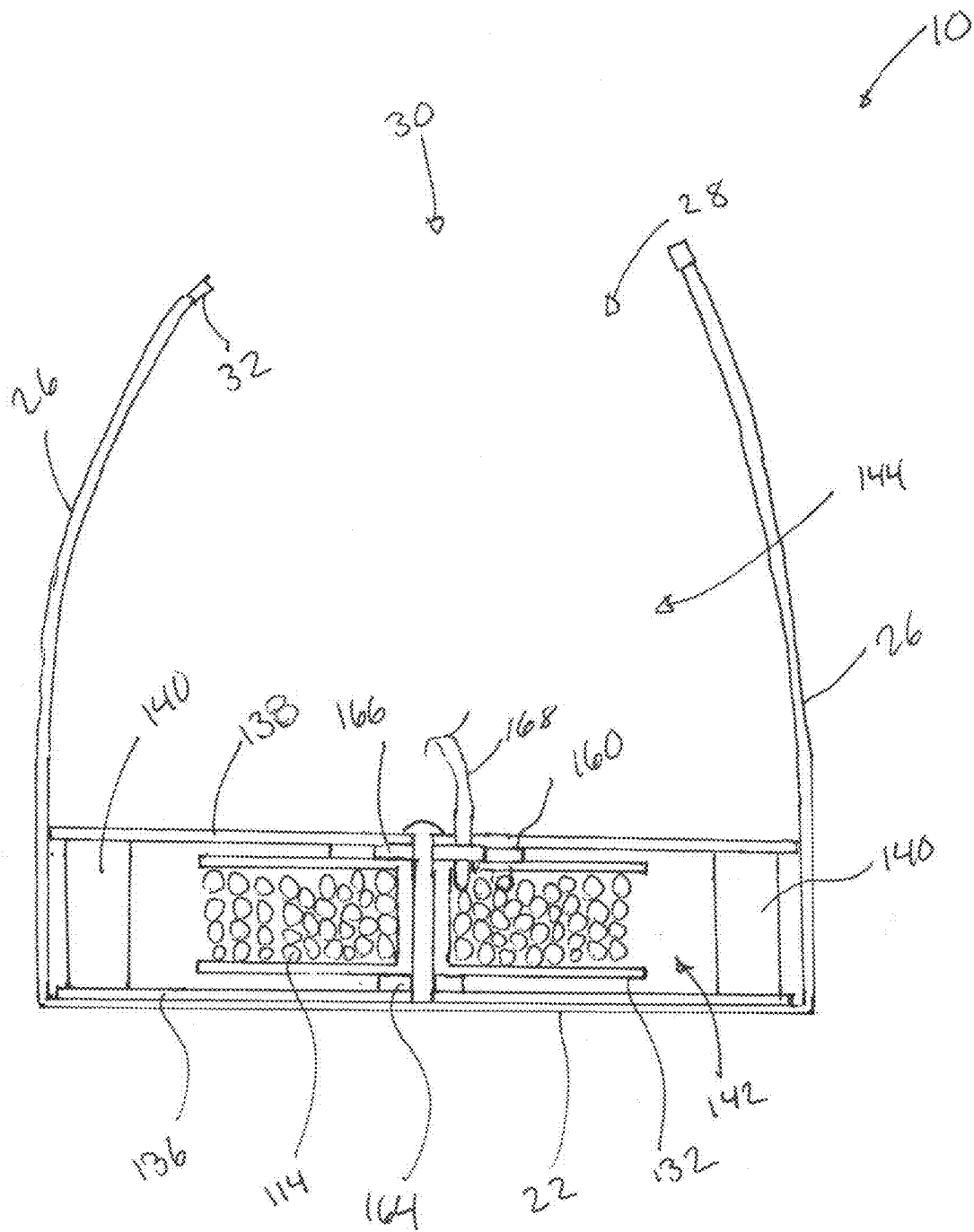
FIG. 7 is a cross-sectional view of the portable storage device of FIG. 1 taken about a plane extending through a first spool, according to an exemplary embodiment.
Figure 8:
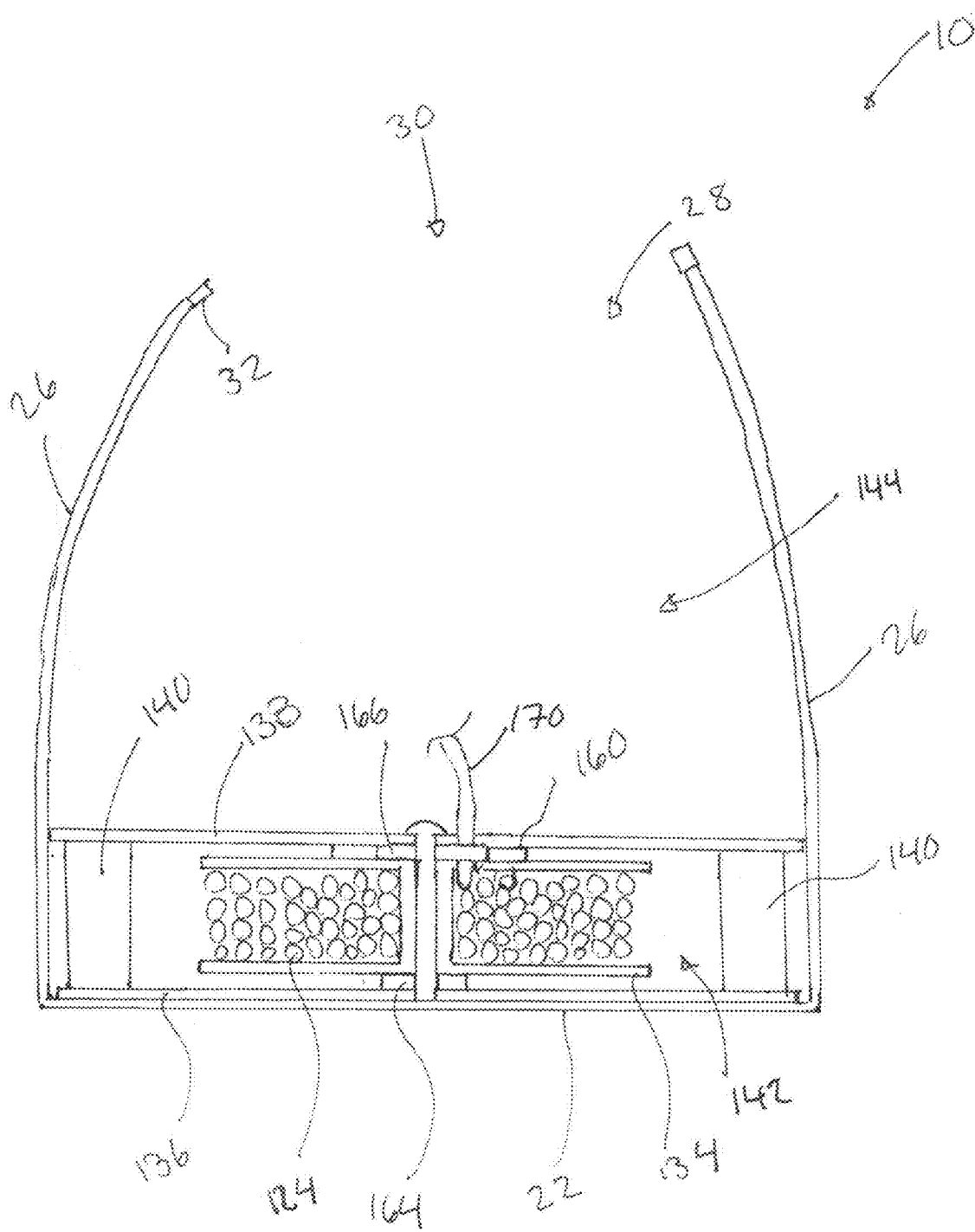
FIG. 8 is a cross-sectional view of the portable storage device of FIG. 1 taken about a plane extending through a second spool, according to an exemplary embodiment.

Referring to FIGS. 5, 7, and 8, the divider 138 extends across the internal volume 28, dividing the internal volume 28 into a first portion, shown as cable volume 142, and a second portion, shown as storage volume 144. The cable volume 142 is positioned below the divider 138 and configured to receive the electrical cord 114 and the electrical cord 124. The storage volume 144 is positioned above the divider 138 and configured to receive equipment.

The base plate 136 may be coupled to the base member 22, and the divider 138 may be coupled to the side panels 24 and the side panels 26 (e.g., with Velcro), rotatably coupling the spool 132 and the spool 134 to the body 20. Alternatively, the base plate 136 and the standoffs may be omitted, and spool 132 and the spool 134 may be directly rotatably coupled to the base member 22. Further alternatively, the spool assembly 130 may be received within the internal volume 28 without a coupling mechanism. In such an embodiment, the side panels 24 and the side panels 26 may contact the divider 138 and/or the base plate 136, preventing the spool assembly 130 from moving horizontally relative to the body 20. Accordingly, the spool 132 and the spool 134 are configured to rotate relative to the body 20.

The electrical cord 114 wraps or winds at least partially around the spool 132 (e.g., half of a wrap, one full wrap, eight full wraps, etc.), and the electrical cord 124 wraps or winds at least partially around the spool 134. When retracted into the internal volume 28, the electrical cords 114, 124 wrap around their respective spools 132, 134. As the electrical cords 114, 124 are extended, the electrical cords 114, 124 unwrap from their respective spools 132, 134. Accordingly, the extension and retraction of the electrical cord 114 and the electrical cord 124 correspond to the rotation of the spool 132 and the spool 134. By way of example, when the electrical cord 114 is extended out of the internal volume 28 (e.g., by pulling the electrical plug 110), the spool 132 rotates in a first direction. When the spool 132 is rotated in a second direction opposite the first direction, the electrical cord 114 is retracted into the internal volume 28 and wraps around the spool 134. The electrical cord 114 and the electrical cord 124 may each extend up to 25 feet or up to 50 feet outside of the body 20.

Figure 6:
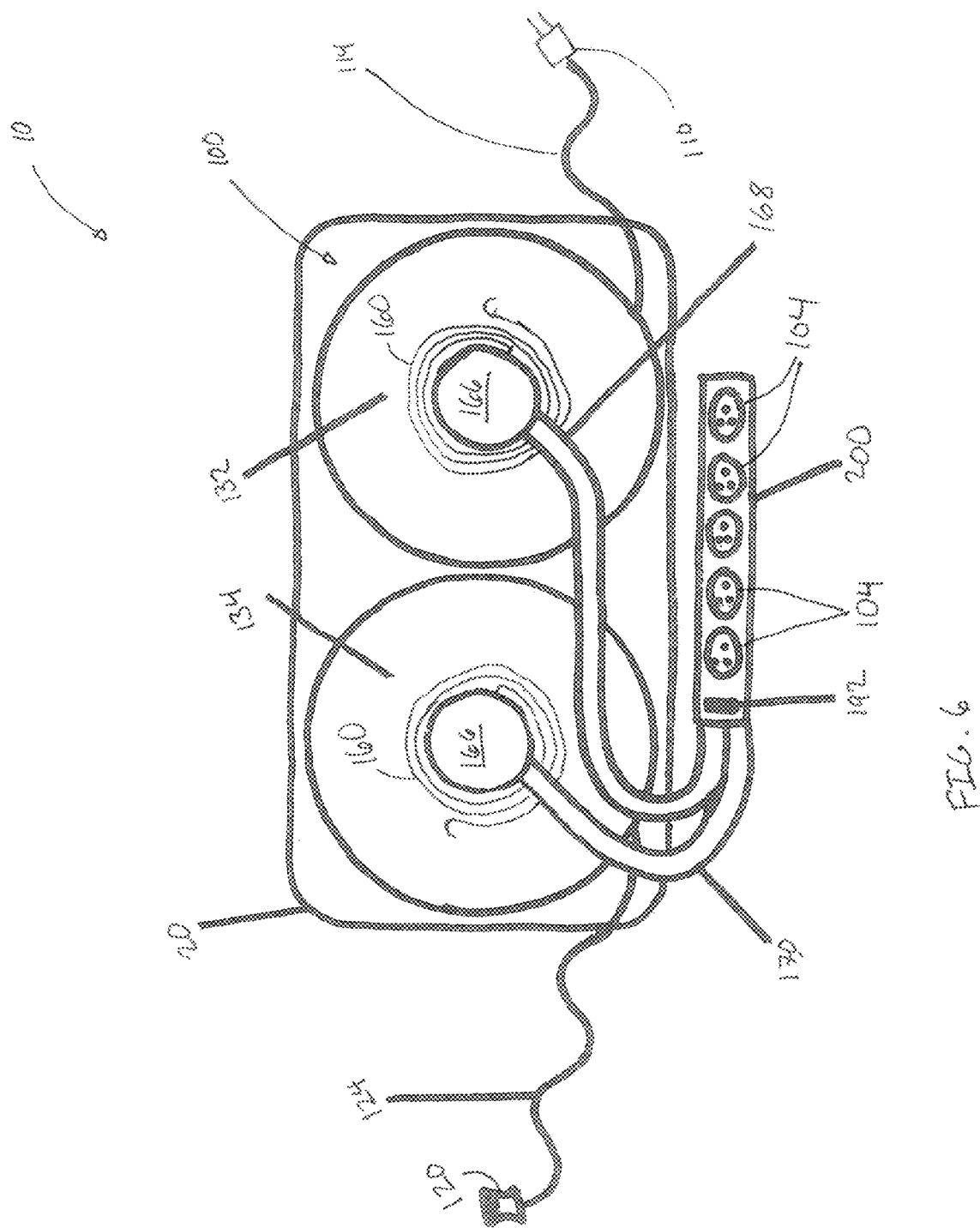
FIG. 6 is a schematic view of the portable storage device of FIG. 1.

Referring to FIGS. 6-8, the spool assembly 130 includes a pair of biasing devices, shown as springs 160. The springs 160 may be constant force or torsion springs. One of the springs 160 is directly coupled to the spool 132 and the divider 138, and the other spring 160 is directly coupled to the spool 134 and the divider 138. Alternatively, the springs 160 may be directly coupled to the base plate 136 or the base member 22 instead of the divider 138. The springs 160 are configured to bias the spool 132 to retract the electrical cord 114 within the cable volume 142 and to bias the spool 134 to retract the electrical cord 124 within the cable volume 142. Accordingly, the if the electrical cord 114 or the electrical cord 124 are extended out of the cable volume 142, the springs 160 bias the electrical cord 114 or the electrical cord 124 to return to the cable volume 142. As shown in FIGS. 2 and 3, the tool bag 10 includes a pair of collars, shown as stops 162, that prevent over-retraction of the electrical cord 114 and the electrical cord 124, which would otherwise pull the electrical plug 110 or the electrical connector 120 into the internal volume 28, making the electrical plug 110 or the electrical connector 120 difficult to access. The stops 162 extend around the electrical cord 114 and the electrical cord 124, respectively. The stops 162 are larger than the aperture 116 and the aperture 126. In one embodiment, the stops 162 are fixedly coupled to the electrical cord 114 and the electrical cord 124, respectively. In another embodiment, the stops 162 slide freely along the electrical cord 114 and the electrical cord 124, but are sized such that the stops 162 cannot extend past the electrical plug 110 or the electrical connector 120. Accordingly, the stops 162 contact the side panels 24 to prevent over-retraction of the electrical cord 114 and the electrical cord 124.

Referring to FIGS. 7 and 8, the spool assembly 130 further includes a pair of locking devices 164 configured to selectively prevent rotation of the spool 132 and/or the spool 134 relative to the base plate 136, the divider 138, and the body 20. One of the locking devices 164 is directly coupled to the spool 132 and the base plate 136, and the other locking device 164 is directly coupled to the spool 134 and the base plate 136. Alternatively, the locking devices 164 may be directly coupled to the divider 138 or the base member 22 instead of the base plate 136. The locking devices 164 will be described in relation to the spool 132, however, the locking devices 164 operate similarly with respect to the spool 134. In one embodiment, each locking device 164 includes a ratcheting mechanism. The ratcheting mechanism corresponding to the spool 132 does not prevent extension of the electrical cord 114. When tension on the electrical cord 114 is released (e.g., by a user releasing the extension cord) with the spool 132 within a locking range of rotational positions, the ratcheting mechanism engages to prevent rotation of the spool 132 in the direction that would retract the electrical cord 114. When tension on the electrical cord 114 is released with the spool 132 positioned outside of the locking range, the ratcheting mechanism allows rotation of the spool 132 in both directions. In this embodiment, the ratcheting mechanism corresponding to the spool 134 performs a similar function for the spool 134. In another embodiment, each locking device 164 includes a threaded lever that tightens the corresponding spool against the base plate 136 and the divider 138, preventing the spool from rotating in either direction.

Referring to FIGS. 6-8, the spool assembly 130 further includes a pair of rotary electrical connectors or slip rings 166 electrically coupling the electrical cord 114 to an electrical cord 168 and electrically coupling the electrical cord 124 to an electrical cord 170. A first portion of each slip ring 166 is fixedly coupled to the divider 138 and a second portion of each slip ring 166 is fixedly coupled to the spool 132 or the spool 134. The slip rings 166 facilitate rotating the spool 132 and the spool 134 without disrupting the electrical connection between the electrical cord 114 the electrical cord 168 or the electrical connection between the electrical cord 124 and the electrical cord 170. Alternatively, the slip rings 166 may be omitted. In such an embodiment, the electrical cord 114 and the electrical cord 168 may be integrally formed from a single electrical cord, and the electrical cord 124 and the electrical cord 170 may be integrally formed from a single electrical cord.

Referring to FIG. 4, the system 100 further includes an onboard power source 180 electrically coupled to the electrical cord 168. The onboard power source 180 is configured to store electrical power and provide the stored electrical power to the electrical outlets 104. The onboard power source 180 allows the system 100 to provide electrical power to the electrical outlets 104 without being connected to the external power source 102. As shown in FIG. 5, the onboard power source 180 is positioned within the cable volume 142, beneath the divider 138. In other embodiments, the onboard power source 180 extends outside of the internal volume 28 (e.g., extends through the body 20 and into one of the pockets 42). The onboard power source 180 may be coupled to the body 20 directly or to the spool assembly 130.

The onboard power source 180 includes an energy storage device, shown as battery module 182. The battery module 182 includes one or more individual batteries. The battery module 182 may rechargeable and/or removable without the use of tools. The battery module 182 is electrically coupled to a power conversion device 184. In one embodiment, the electrical outlets 104 are supplied with AC electrical power. In some such embodiments, the power conversion device 184 includes an inverter and a converter. The inverter is configured to receive DC electrical power from the battery module 182 and provide AC electrical power to supply to the electrical outlets 104. The converter is configured to receive AC electrical power from the external power source 102 through the electrical cord 168 and provide DC electrical power to charge the battery module 182. The power conversion device 184 may additionally include other power conversion electronics, such as voltage regulators or current limiting devices. In some embodiments, the electrical plug 110, the electrical cord 114, the spool 132, and the electrical cord 168 are omitted. In such embodiments, the power conversion device 184 may or may not include a converter. In some embodiments, the power conversion device 184 does not include an inverter, and the electrical outlets 104 are supplied with DC electrical power. In other embodiments, the onboard power source 180 is omitted.

Referring again to FIG. 4, the system 100 further includes an electrical disconnect device or current limiting device, shown as circuit breaker 190. The circuit breaker 190 is electrically coupled to the electrical cord 168 and the onboard power source 180. When in a connected configuration, the circuit breaker 190 electrically couples the onboard power source 180 and the electrical cord 168 to components on the opposing side of the circuit breaker 190 (e.g., the electrical connector 120, the power strip 200, and the battery charger 210). When in a disconnected configuration, the circuit breaker 190 is configured to electrically decouple the external power source 102 and the onboard power source 180 from the components on the opposite side of the circuit breaker 190. The circuit breaker 190 is configured to automatically change from the connected configuration to the disconnected configuration in response to a current passing through the circuit breaker 190 exceeding a threshold current (e.g., 15 amperes). The circuit breaker 190 may automatically change back to the connected configuration when the current falls below the threshold current for a threshold period of time.

In some embodiments, the circuit breaker 190 includes a switch 192 that is repositionable between a first position (e.g., an "off" position) and a second position (e.g., a "reset" position). When the switch 192 is in the "off" position, the switch 192 configures the circuit breaker 190 into the disconnected configuration. When the switch 192 is moved from the "off" position to the "reset" position, the switch 192 configures the circuit breaker 190 into the connected configuration. In some such embodiments, after changing to the disconnected configuration in response to the current exceeding the threshold current, the circuit breaker 190 remains in the disconnected configuration until the switch 192 is moved from the "off" position to the "reset" position. The circuit breaker 190 prevents an undesired amount of current flowing through the system 100. The inclusion of the switch 192 allows a user to reset the circuit breaker 190 at the tool bag 10 instead of having to reset a breaker of the external power source 102. In some situations, the breaker of the external power source 102 is inaccessible to the user. By way of example, the user may be working on the exterior of a building, and the breaker of the external power source 102 (e.g., an electrical outlet of the building) may in a locked area inside the building. The switch 192 also facilitates controlling the supply of electrical power to all of the electrical outlets 104 simultaneously. In other embodiments, the circuit breaker 190 includes the switch 192 and does not disconnect electrical power in response to current.

Referring to FIGS. 1, 4, and 6, the system 100 further includes a power distribution device, shown as power strip 200. The power strip 200 defines a plurality of electrical outlets 104. The power strip 200 is electrically coupled to the circuit breaker 190 such that the electrical outlets 104 of the power strip 200 are electrically decoupled from the external power source 102 and the onboard power source 180 when the circuit breaker 190 is in the disconnected configuration. The power strip 200 is electrically coupled to the external power source 102 and the onboard power source 180 when the circuit breaker 190 is in the connected configuration. The power strip 200 is coupled to an exterior surface of the side panel 26 such that the electrical outlets 104 of the power strip 200 face outwards, away from the internal volume 28. Accordingly, the electrical outlets 104 of the power strip 200 are accessible from the exterior of the body 20 regardless of whether the main opening 30 is open or closed. In some embodiments, the side panel 26 defines an aperture 202 positioned proximate or adjacent the power strip 200. The aperture 202 extends from outside the body 20 to the internal volume 28. The aperture 202 facilitates running electrical cords from devices within the internal volume 28 to the power strip 200 without preventing the main opening 30 from closing fully. The aperture 202 may be positioned at least partially directly behind the power strip 200 such that at least a portion of the aperture 202 is obscured from view by the power strip 200.

Referring to FIG. 4, in some embodiments, the power strip 200 includes a power conversion device 204. In some embodiments, the power conversion device 204 includes power conversion electronics (e.g., inverters, converters, voltage regulators, current limiting devices, etc.) configured to regulate the electrical power provided by each electrical outlet 104 of the power strip 200. By way of example, the power strip 200 may receive AC electrical power at 120 volts from the circuit breaker 190. The power strip 200 may provide some of this electrical power directly to some electrical outlets 104, and the power conversion device 204 may convert some of this electrical power to DC electrical power at 5 volts to supply to other electrical outlets 104 configured as USB ports.

Referring again to FIG. 4, in some embodiments, the system 100 further includes a charger, shown as battery charger 210. The battery charger 210 is electrically coupled to the circuit breaker 190 such that the battery charger 210 is electrically decoupled from the external power source 102 and the onboard power source 180 when the circuit breaker 190 is in the disconnected configuration. The battery charger 210 is electrically coupled to the external power source 102 and the onboard power source 180 when the circuit breaker 190 is in the connected configuration. The battery charger 210 may be directly electrically coupled to the circuit breaker 190 or indirectly electrically coupled through the power strip 200. The battery charger 210 is configured to supply electrical power to charge one or more rechargeable energy storage devices or battery modules, shown as removable batteries 212. The removable batteries 212 each include one or more individual batteries.

The removable batteries 212 may be removed from the tool bag 10 and used to power a piece of equipment, such as a hand drill, a reciprocating saw, a flashlight, or a cellular phone. The removable batteries 212 are each removably coupled to the battery charger 210 through an electrical outlet 214. The electrical outlets 214 may include rails or other locking devices to facilitate selectively coupling the removable batteries 212 to the battery charger 210 such that the removable batteries 212 can be removed without the use of tools. The battery charger 210 may be coupled to the body 20 and/or to the spool assembly 130. By way of example, the battery charger 210 may be coupled to the divider 138 such that the battery charger 210 is positioned within the cable volume 142 and the electrical outlets 214 extend into the storage volume 144. By way of another example, the battery charger 210 may be coupled to the body 20 such that the battery charger 210 is positioned within the internal volume 28 and the electrical outlets 214 extend outside of the body 20.

Referring to FIG. 4, in some embodiments, the battery charger 210 includes a power conversion device 216. The power conversion device 216 includes power conversion electronics (e.g., inverters, converters, voltage regulators, current limiting devices, etc.) configured to regulate the electrical power provided by each electrical outlet 214 of the battery charger 210. The power conversion electronics may modify the current or voltage provided by the electrical outlets 214 or whether the electrical outlets 214 output AC or DC electrical power.

FIGS. 9A-9F illustrate a variety of alternative embodiments of the tool bag 10. FIG. 9A illustrates the tool bag 10 as shown and described above, including the electrical cord 114 wrapped around the spool 132, the electrical 124 wrapped around the spool 134, the power strip 200, and the onboard power source 180. In FIG. 9B, the onboard power source 180 is omitted. In FIG. 9C, the power strip 200 is omitted. In FIG. 9D, the spool 132 is omitted, and the electrical cord 114 has a fixed length. In this embodiment, the electrical cord 114 may be coiled for storage. The tool bag 10 may include one or more hooks or protrusions 220 extending from the body 20, around which the electrical cord 114 may be coiled. Alternatively, the system 100 may include a connector that facilitates selectively disconnecting and removing the electrical cord 114 for storage. In FIG. 9E, the spool 134 is omitted, and the electrical cord 124 has a fixed length. In this embodiment, the electrical cord 124 may be coiled for storage. The tool bag 10 may include one or more hooks or protrusions 220 extending from the body 20, around which the electrical cord 124 may be coiled. Alternatively, the system 100 may include a connector that facilitates selectively disconnecting and removing the electrical cord 124 for storage. In FIG. 9F, the spool 132, the electrical cord 114, and the electrical plug 110 are omitted, and the system 100 is powered solely by the onboard power source 180. In this embodiment, the battery module 182 of the onboard power source 180 may be exchanged for a charged battery module 182 when depleted. In FIG. 9G, the spool 134, the electrical cord 124, and the electrical connector 120 are omitted.

Although the portable storage device is shown as a tool bag 10, other types of portable storage devices may utilize the system 100. The portable storage device may be a container, a tote, an organizer, a tool box, a storage container, a chest, a cabinet, a utility container, jobsite storage, a tool carrier, a utility bag, an emergency medical technician (EMT) bag, a cart, a bucket, a crate, or a backpack. The portable storage device may be portable using handles or straps (e.g., the handles 40) to facilitate lifting and/or pulling or using wheels, slides, or skids to facilitate rolling and/or sliding. As the portable storage device includes the system 100, the portable storage device may be considered a portable power supply or portable power distribution device.

In operation, a user, such as a craftsman, fills the tool bag 10 with equipment and brings the tool bag 10 to a job site. The user places the tool bag 10 in a convenient, accessible location near where they will be working. The user then pulls on the plug 110 to extend the electrical cord 114 out of the body 20 a sufficient length to reach an electrical outlet of the external power source 102 (e.g., an electrical outlet of a building). Once the electrical cord 114 is extended a sufficient length, the user may engage the locking mechanism 164 to prevent the biasing mechanism 160 from applying undesired tension on the electrical cord 114. The user then connects the electrical plug 110 to the outlet to supply electrical power to the system 100. Due to the substantial length of the electrical cord 114 and the biasing effect of the biasing device 160, the user can easily access electrical outlets, both close to and far away from the tool bag 10. Once the electrical plug 110 is receiving electrical power, the power conversion device 184 converts AC electrical power to DC electrical power to charge the battery module 182. Alternatively, the user may choose to not connect the plug 110 to the external power source 102, instead relying on the electrical power stored in the onboard storage device 180.

To supply electrical power to the electrical connector 120, the power strip 200, and the battery charger 210 from the external power source 102 or the onboard power source 180, the user can reposition the switch 192 from the "off" position to the "reset" position. The user may then connect equipment to any of the electrical outlets 104 to power the equipment. If the user chooses to work in close proximity to the body 20, they might choose to utilize the electrical outlets 104 of the power strip 200. If the user chooses to work away from the body 20, the user might choose to utilize the electrical outlets 104 of the electrical connector 120. In such a situation, the user can pull on the electrical connector 120 until a sufficient length of the electrical cord 124 has been extended. The user may then engage the locking mechanism 164 to prevent the biasing mechanism 160 from applying undesired tension on the electrical cord 124. While the user is working, the battery charger 210 supplies electrical power to the removable batteries 212. Due to the inclusion of the battery charger 210 within the system 100, the user does not have to separately connect the battery charger 210 to the external power source 102. When the removable battery 212 of a cordless tool, such as a hand drill, becomes depleted of charge, the user can simply return to the body 20 to exchange the depleted removable battery 212 for a charged removable battery 212 from the battery charger 210.

When the user wishes to move to a different area, the user can move the switch 192 to the "off" position to stop supplying electrical power to the electrical connector 120, the power strip 200, and the battery charger 210, and/or disconnect the plug 110 from the external power source 102. The user can then simply disengage the locking mechanisms 164, and the electrical cord 114 and the electrical cord 124 will automatically retract within the internal volume 28. Because the battery charger 210 is positioned within the internal volume 28, the user has a minimal risk of losing the removable batteries 212 and the charger 210.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A bag for transporting tools and building supplies comprising:
   a body comprising:
      a base member; and
      at least one side panel coupled to the base member and extending from the base member, wherein the base member and the at least one side panel cooperate to define an internal volume, and wherein the internal volume is accessible through a main opening defined by the at least one side panel;
   a first spool rotatable relative to the body and positioned within the internal volume;
   a second spool rotatable relative to the body and positioned within the internal volume;
   a first electrical cord extending outside of the body, wherein the first electrical cord wraps at least partially around the first spool;
   an electrical plug coupled to a distal end of the first electrical cord;

a second electrical cord extending outside of the body, wherein the second electrical cord wraps at least partially around the second spool;
an electrical connector coupled to a distal end of the second electrical cord and defining at least one electrical outlet;
a divider positioned within the internal volume and coupled to at least one of the first spool, the second spool, and the body, wherein the divider is configured to divide the internal volume into a cable volume and a storage volume, and wherein the first spool and the second spool are positioned within the cable volume; and
a battery charger electrically coupled to at least one of the first electrical cord and the second electrical cord,
wherein the electrical plug is electrically coupled to the electrical connector though the first electrical cord and the second electrical cord, and wherein the electrical plug is configured to interface with an external power source such that the at least one electrical outlet receives electrical power from the external power source; and
wherein the battery charger is configured to be selectively coupled to a removable battery, wherein the battery charger extends into the cable volume, and wherein the removable battery extends into the storage volume when the removable battery is coupled to the battery charger.

2. The bag of claim 1, further comprising a first biasing device coupled to the first spool and a second biasing device coupled to the second spool, wherein the first biasing device is configured to bias the first spool to retract the first electrical cord at least partially within the internal volume, and wherein the second biasing device is configured to bias the second spool to retract the second electrical cord at least partially within the internal volume.

3. The bag of claim 2, further comprising a first locking device coupled to the first spool and a second locking device coupled to the second spool, wherein the first locking device is configured to selectively prevent rotation of the first spool relative to the body, and wherein the second locking device is configured to selectively prevent rotation of the second spool relative to the body.

4. The bag of claim 3, wherein the first electrical cord and the second electrical cord can be extended and retracted independent of one another.

5. The bag of claim 1, further comprising a circuit breaker electrically coupled between the electrical plug and the electrical connector, wherein the circuit breaker is configured to electrically decouple the electrical plug from the electrical connector in response to a current passing through the circuit breaker exceeding a threshold current.

6. The bag of claim 5, wherein the circuit breaker includes a switch that is selectively repositionable between a first position and a second position, wherein the circuit breaker is further configured to electrically decouple the electrical plug from the electrical connector in response to the switch being moved to the first position, and wherein the circuit breaker is configured to electrically couple the electrical plug and the electrical connector in response to the switch moving from the first position to the second position.

7. The bag of claim 1, wherein the removable battery is a rechargeable power tool battery.

8. The bag of claim 1, wherein the divider is directly coupled to the first spool and the second spool.

9. The bag of claim 1, wherein the divider extends substantially parallel to the base member of the body.

10. A portable storage device for transporting equipment comprising:
a body defining an internal volume that is accessible through a main opening;
a spool rotatable relative to the body and positioned within the internal volume;
an electrical cord extending outside of the body, wherein the electrical cord wraps at least partially around the spool;
an electrical plug coupled to a distal end of the electrical cord;
a power strip coupled to the body, the power strip defining a plurality of electrical outlets;
a divider separating the internal volume into a cable volume and a storage volume, wherein the spool is positioned within the cable volume; and
a battery charger electrically coupled to at least one of the electrical cord and the power strip,
wherein the electrical plug is electrically coupled to the power strip though the electrical cord, and wherein the electrical plug is configured to interface with an external power source such that the electrical outlets each receive electrical power from the external power source,
wherein the battery charger is configured to be selectively coupled to a removable battery, wherein the battery charger extends into the cable volume, and wherein the removable battery extends into the storage volume when the removable battery is coupled to the battery charger.

11. The portable storage device of claim 10, wherein the body is selectively repositionable to open or close the main opening, and wherein the electrical outlets of the power strip are accessible from outside of the body both when the main opening is open and when the main opening is closed.

12. The portable storage device of claim 11, wherein the body defines an aperture positioned adjacent the power strip, and wherein the aperture extends from outside of the body to the internal volume.

13. The portable storage device of claim 10, further comprising a biasing device and a locking device each coupled to the spool, wherein the biasing device is configured to bias the spool to retract the electrical cord within the internal volume, and wherein the locking device is configured to selectively prevent rotation of the spool relative to the body.

14. The portable storage device of claim 10, further comprising a circuit breaker electrically coupled between the electrical plug and the power strip, wherein the circuit breaker is configured to electrically decouple the electrical plug from the power strip in response to a current passing through the circuit breaker exceeding a threshold current.

15. The portable storage device of claim 14, wherein the circuit breaker includes a switch selectively repositionable between a first position and a second position, wherein the circuit breaker is further configured to electrically decouple the electrical plug from the power strip in response to the switch being moved to the first position, and wherein the circuit breaker is configured to electrically couple the electrical plug and the power strip in response to the switch moving from the first position to the second position.

16. A portable power supply comprising:
a body defining a storage space that is accessible through a main opening;
a spool rotatable relative to the body and positioned within the storage space;

a first electrical cord extending outside of the body, wherein a proximal end of the first electrical cord wraps at least partially around the spool;
an electrical connector coupled to a distal end of the first electrical cord and defining at least one electrical outlet;
a power strip coupled to the body, the power strip defining a plurality of electrical outlets;
a divider separating the storage space into a cable volume and a storage volume, wherein the spool is positioned within the cable volume; and
a battery charger electrically coupled to at least one of the first electrical cord and the power strip,
wherein the electrical connector is electrically coupled to a power source though the first electrical cord, wherein the power strip is electrically coupled to the power source, and wherein the at least one electrical outlet of the electrical connector and the electrical outlets of the power strip are configured to receive electrical power from the power source,
wherein the battery charger is configured to be selectively coupled to a removable battery, wherein the battery charger extends into the cable volume, and wherein the removable battery extends into the storage volume when the removable battery is coupled to the battery charger.

17. The portable power supply of claim 16, wherein the power source is an onboard power source including an energy storage device coupled to the body and extending at least partially within the storage space.

18. The portable power supply of claim 17, further comprising:
a second electrical cord; and
an electrical plug coupled to a distal end of the second electrical cord;
wherein the electrical plug is electrically coupled to the energy storage device through the second electrical cord, and wherein the electrical plug is configured to interface with an external power source such that the energy storage device receives electrical power from the external power source to charge the energy storage device.

19. The portable power supply of claim 16, wherein the body is selectively repositionable to open or close the main opening, and wherein the electrical outlets of the power strip are accessible from outside of the body both when the main opening is open and when the main opening is closed.

20. The portable power supply of claim 16, further comprising an electrical disconnect device electrically coupled between (a) the electrical connector and the power strip and (b) the power source, the electrical disconnect device including a switch selectively repositionable between a first position and a second position;
wherein the electrical disconnect device is configured to electrically decouple the electrical connector and the power strip from the power source in response to the switch being moved to the first position; and
wherein the electrical disconnect device is configured to electrically couple the power strip and the electrical connector to the power source in response to the switch moving from the first position to the second position.

\* \* \* \* \*